Patented Apr. 12, 1927.

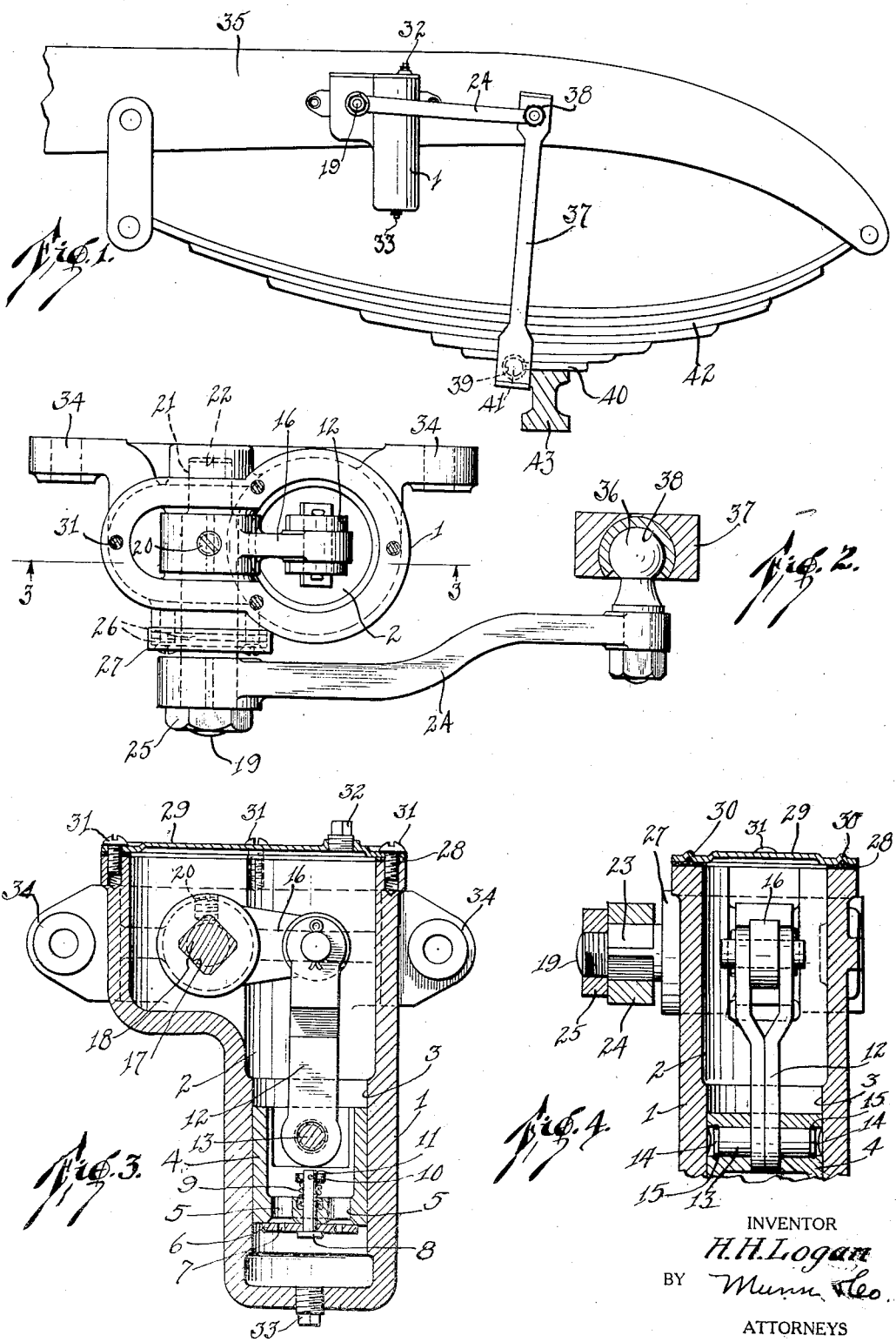

1,624,265

UNITED STATES PATENT OFFICE.

HENRY HAVELOCK LOGAN, OF CHICAGO, ILLINOIS.

SHOCK ABSORBER.

Application filed April 12, 1926. Serial No. 101,496.

My invention relates to improvements in shock absorbers, and it consists in the combinations, constructions, and arrangements herein described and claimed.

An object of my invention is to provide a shock absorber of the liquid controlled type which is inexpensive to manufacture and which will operate efficiently.

A further object of my invention is to provide a device of the type described which has a single compartment, and novel means for controlling the movement of the parts within the compartment.

A further object of my invention is to provide a device of the type described which is accessible for repair by removing a single screw.

Other objects and advantages will appear in the following specification, and the novel features of the invention will be particularly pointed out in the appended claims.

My invention is illustrated in the accompanying drawings, forming part of this application, in which—

Figure 1 is a side elevation of the device, as applied to a vehicle,

Figure 2 is a plan view of the device,

Figure 3 is a section along the line 3—3 of Figure 2, and

Figure 4 is a fragmentary view of the device.

In carrying out my invention, I provide a casing 1 having a compartment 2 therein. The lower portion of the compartment 2 is bored out so as to form a cylinder 3 in which a piston 4 is movably disposed. The head of the piston is provided with a plurality of openings 5 cooperating with an annular groove in the face of the piston. A plate 6 having a plurality of relatively small openings 7 therein is disposed against the head of the piston 4, the periphery of the plate extending beyond the openings 5. The plate 6 is held in close engagement with the head of the piston 4 by means of a pin 8 and a spring 9 which is disposed concentric with the pin. The lower end of the spring 9 is received within a recess in the piston head, and the opposite end of the spring strikes against a cup-shaped washer 10, which is held in place by a pin 11.

A connecting rod 12 is formed of two like members, each having one of their ends bent outwardly and upwardly so as to form a fork when the remaining portions of each member are placed together and electrically spot-welded. The other end of the connecting rod is pivotally secured to the piston by a piston pin 13. The piston pin 13 is held in place by split rings 14, which are partially received within the annular recesses 15 in the piston. The forked end of the connecting rod 12 straddles one end of a lever 16, and is pivotally secured thereto. The other end of the lever 16 is provided with a substantially square opening 17, which is adapted to receive a square portion 18 of a shaft 19. The lever 16 is removably secured to the shaft 19 by a set-screw 20. The shaft 19 has a reduced portion 21 which is rotatably mounted in a recess 22 in the casing 1. The free end of the shaft 19 extends through the casing 1 and is provided with another substantially square portion 23 upon which an arm 24 is placed and rigidly held by means of a nut 25. A plurality of felt washers 26 is disposed concentric with the shaft 19 and held in place by a cup-shaped cover 27.

A felt gasket 28 which is cut to conform to the top of the casing 1 is disposed thereon. A cover 29 having recesses 30 therein is placed upon the gasket 28 and removably secured in place by means of screws 31. As the screws 31 are moved downwardly, the gasket 28 is compressed, thus forcing a portion of the gasket into the recesses 30, and providing an oil-tight connection. The top 29 is provided with a threaded opening which is adapted to receive a filler plug 32. The casing 1 is provided with the drain plug 33. The casing 1 also has integral flanges 34 which are provided with openings adapted to receive any suitable means for securing the casing to the frame 35, as shown in Figure 1.

The lever 24 is provided with a ball 36, the center of the ball being in alignment with the center of the casing 1. A link 37, which is provided with ball-receiving sockets 38 and 39, is secured at one end to the ball 36, and at the opposite end to a bracket 40. The bracket 40 is provided with a ball 41, which is received within the socket 39. The bracket 40 is disposed between a spring 42 and an axle 43 and rigidly secured in place.

From the foregoing description of the various parts of the device, the operation thereof may be readily understood. The filler plug 32 is first removed and the compartment 2 is filled with a lubricating oil. The oil can be of any desired grade. It is obvious, however, that if a heavy oil is placed within the compartment, the piston will move more slowly than if a lighter grade of oil is placed therein. After the oil has been placed within the compartment, and the filler plug 32 is again put in place, the device is ready to be used.

Let us assume that the axle 43 is forced upwardly against the tension of the spring 42. In this upward movement, the lever 37 will move upwardly, causing the lever 24 to rotate the shaft 19 in a counter-clockwise direction, and by so doing the lever 16, together with the connecting rod 12, pulls the piston 4 upwardly. As the piston 4 is moved upwardly it is moved against the body of oil which is within and above the piston. The body of oil forces against the plate 6, causing the plate to move downwardly against the tension of the spring 9, and permitting the oil to flow freely through the openings 5 within the piston. It is obvious that a portion of the oil will flow through the openings 7 in the plate 6, but they are not sufficiently large to permit the oil to flow through the piston at a relatively great speed.

As the axle 43 is forced downwardly into normal position by the spring 42, the link 37 is also pulled downwardly causing the lever 24 to rotate the shaft 19 in a clockwise direction. During this movement the lever 16, together with the connecting rod 12 forces the piston 4 downwardly against the body of oil which is beneath the piston. In the movement downwardly of the piston 4, the body of oil beneath the piston is permitted to escape only through the small openings 7 in the plate 6. In this manner the piston 4 is only allowed to move downwardly at a relatively slow rate of speed. This is the means for causing the axle 43 to return to its normal position at a slow rate of speed whereby the vehicle will not be jarred.

It is obvious that the movement downwardly of the piston 4 is governed by the size of the openings 7 within the plate 6. To vary the speed of the piston 4, plates having larger or smaller openings therein can be substituted for the plate 6. To remove the plate 6 the cover 29 is first removed from the casing 1, then by loosening the set-screw 20 a sufficient distance the shaft 19 can be moved from the casing 1, thus permitting the lever 16, the connecting rod 12, and the piston 4 to be removed from the casing 1. By pressing upon the cup-shaped washer 10 against the tension of the spring 9 a sufficient distance, the pin 11 can readily be removed from the pin 8. In this manner the washer 10 and the spring 9 can be removed from the pin 8, and the pin 8 removed from the piston 4, thus freeing the plate 6. A new plate can be placed against the piston 4 and the pin 8 again secured in place.

I claim:

1. A shock absorber comprising a casing having a single compartment therein adapted to contain a liquid, a portion of said compartment being fashioned into a cylinder, a piston movably disposed in said cylinder, and having a plurality of relatively large openings therein, and a spring-pressed plate disposed over the openings, said plate being adapted to move free from said piston, whereby the liquid may flow through the openings in said piston during the movement of the piston upwardly, said plate having relatively small openings therein, whereby the speed of the piston is limited during the downward movement of the piston.

2. The combination with an automobile having a frame, an axle, and a spring, of a shock absorber comprising a casing rigidly mounted upon said frame and having a compartment therein, a portion of the compartment being fashioned into a relatively short cylinder, said cylinder being positioned away from the bottom of said compartment, a relatively short piston movably disposed in said cylinder, means for operatively connecting said piston to said axle and said spring, and means for permitting said axle and said piston to freely move upwardly and for limiting the speed of said axle and said piston in their movement downwardly.

3. A shock absorber comprising a casing having a compartment therein adapted to contain a liquid, a portion of said compartment being fashioned into a relatively short cylinder, said cylinder being positioned away from the bottom of said compartment, a relatively short piston movably disposed in said cylinder, and means for moving said piston upwardly, said piston having relatively large openings therein for permitting the liquid to freely flow therethrough, whereby said piston may be moved upwardly at a relatively great speed.

4. In a device of the type described, a casing, a cylinder in said casing, a piston slidably disposed in said cylinder, a shaft being rotatably mounted in said casing and having flattened portions thereon, a relatively short lever having an opening adapted to receive one of the flattened portions of said shaft, means for operatively connecting said relatively short lever to said piston, a relatively long lever having an opening therein adapted to receive the other flattened portion of said shaft, and a ball disposed upon the free end of said relatively long lever, the center line of said ball being in direct alignment with the center line of said relatively short lever.

5. In a device of the type described, a relatively short piston having relatively large openings in the lower end thereof, the lower end of said piston having an annular groove communicating with said openings, a plate having relatively small openings therein disposed adjacent the lower end of said piston, and spring-pressed means for holding said plate adjacent said piston.

6. In a device of the type described, a relatively short piston having relatively large openings in the lower end thereof, the lower end of said piston having an annular groove communicating with said openings, a plate having relatively small openings therein disposed adjacent the lower end of said piston, spring-pressed means for holding said plate adjacent said piston, said means comprising a relatively large pin disposed through said plate and the lower end of said piston and provided with an enlarged head portion adapted to bear against the lower surface of said plate, a compression spring disposed concentric with said relatively large pin, a cup-shaped washer disposed concentric with said relatively large pin, and a relatively small pin disposed within an opening in said relatively large pin and adapted to be held in place by said cup-shaped washer.

HENRY HAVELOCK LOGAN.